Aug. 20, 1968    J. B. GUIN    3,397,680

REVERSING BLADE ROTARY ENGINE

Filed April 19, 1966    13 Sheets-Sheet 1

INVENTOR.
JOEL B. GUIN

INVENTOR.
JOEL B. GUIN

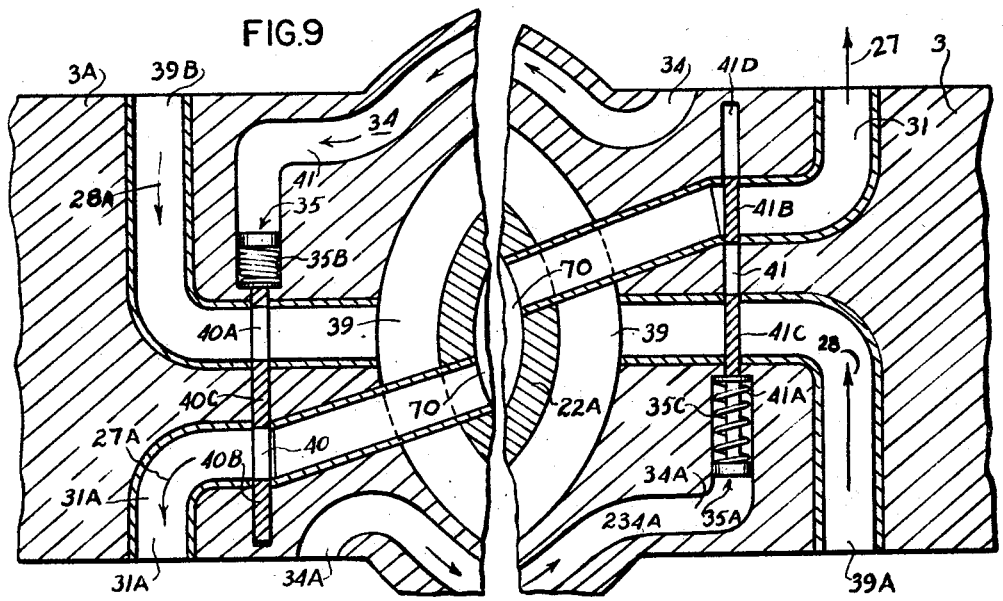
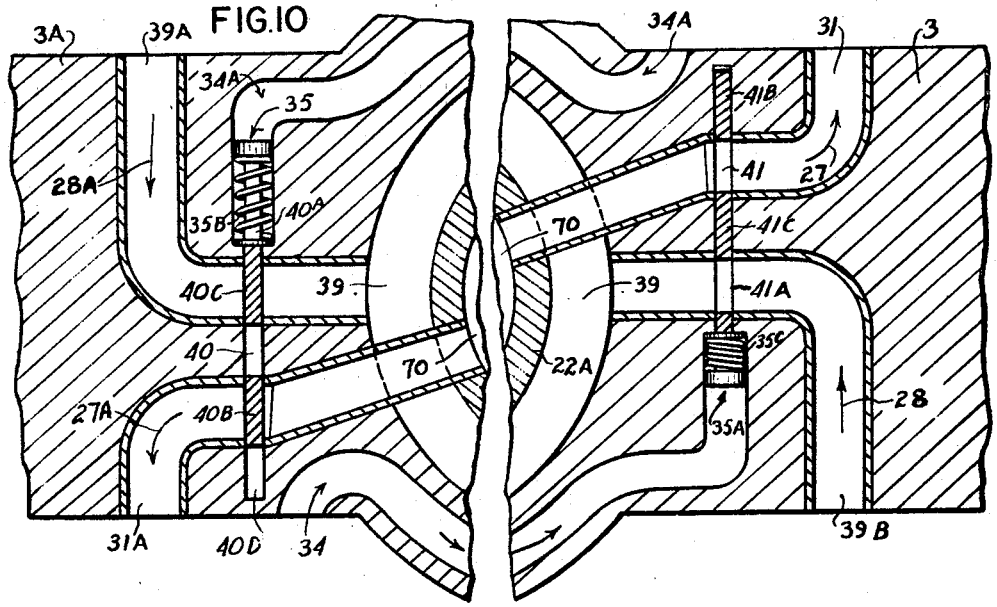

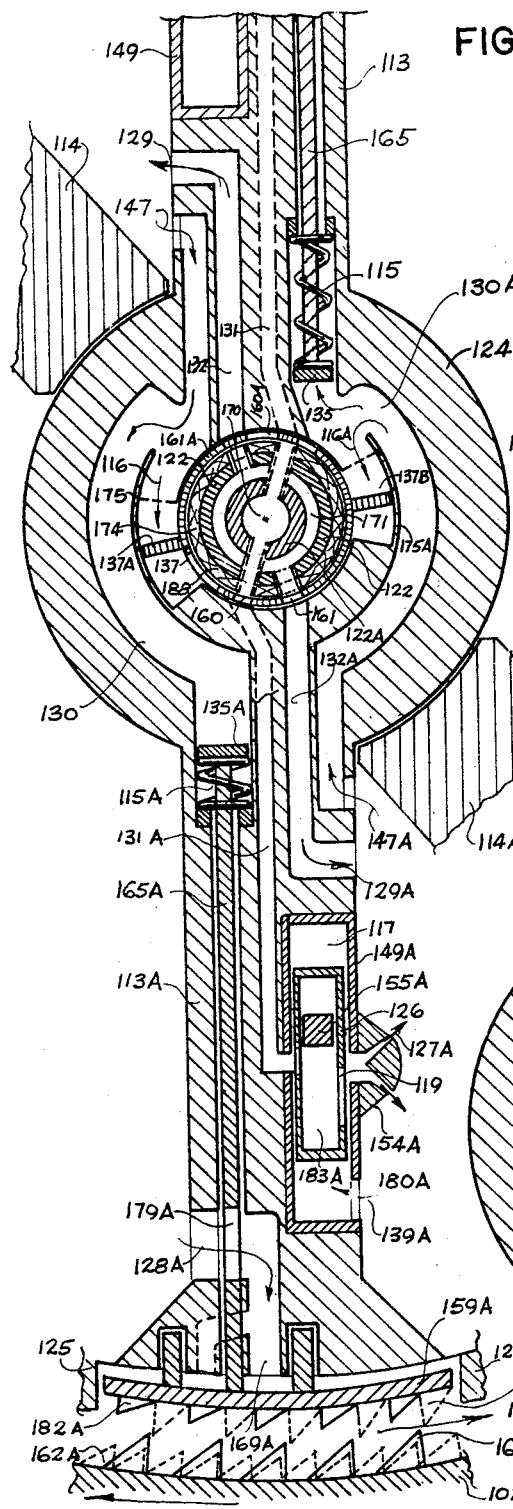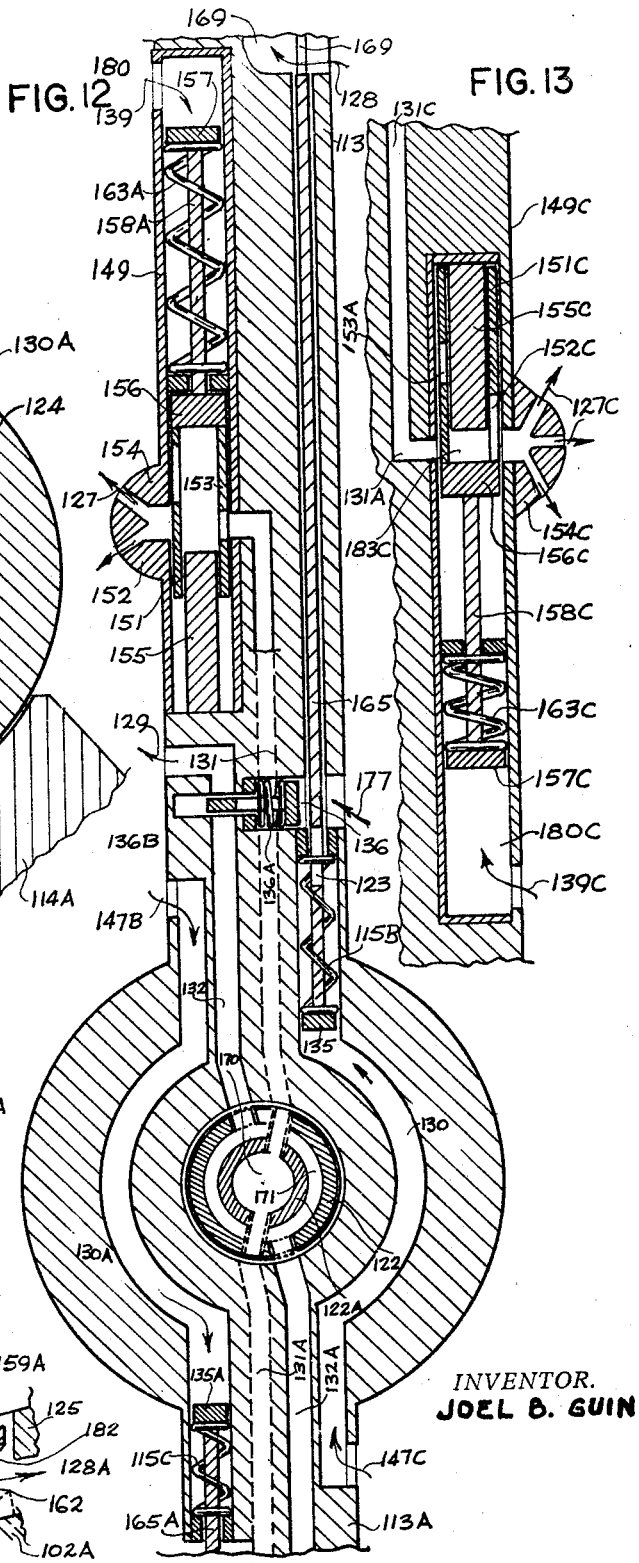

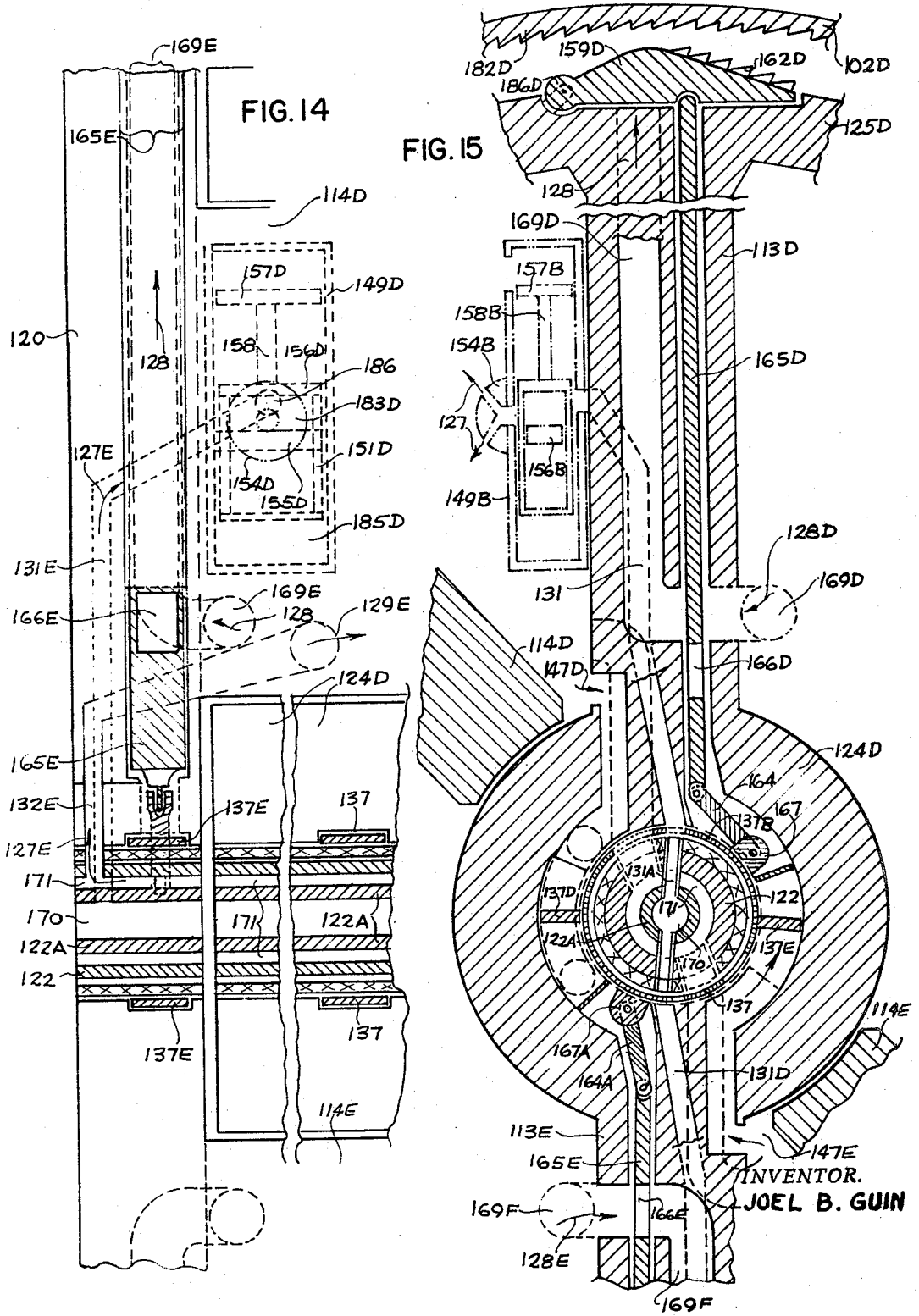

Aug. 20, 1968

J. B. GUIN 3,397,680

REVERSING BLADE ROTARY ENGINE

Filed April 19, 1966

INVENTOR.
JOEL B. GUIN

Aug. 20, 1968 J. B. GUIN 3,397,680
REVERSING BLADE ROTARY ENGINE
Filed April 19, 1966 13 Sheets-Sheet 7

INVENTOR.
JOEL B. GUIN

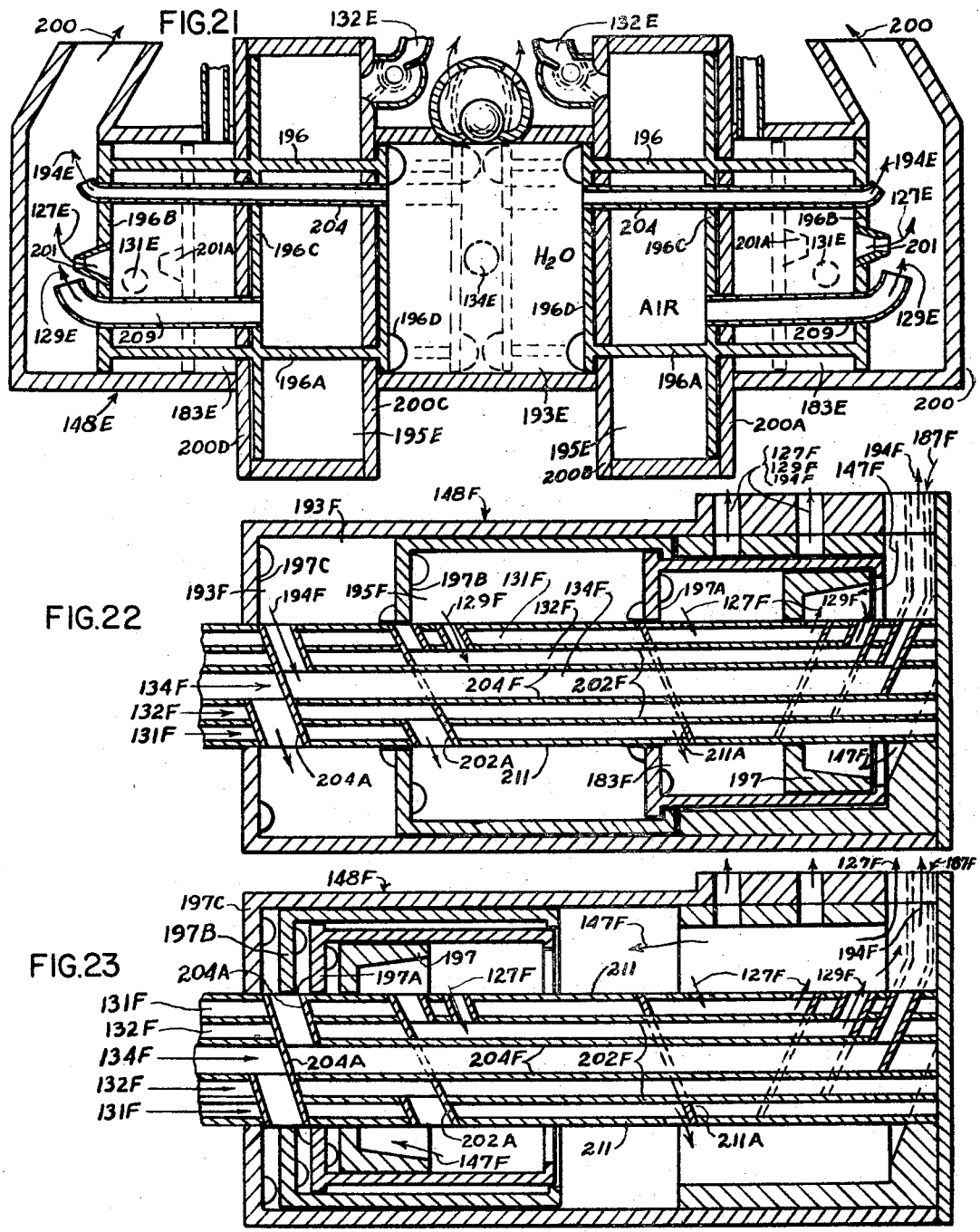

Aug. 20, 1968    J. B. GUIN    3,397,680
REVERSING BLADE ROTARY ENGINE
Filed April 19, 1966    13 Sheets-Sheet 9
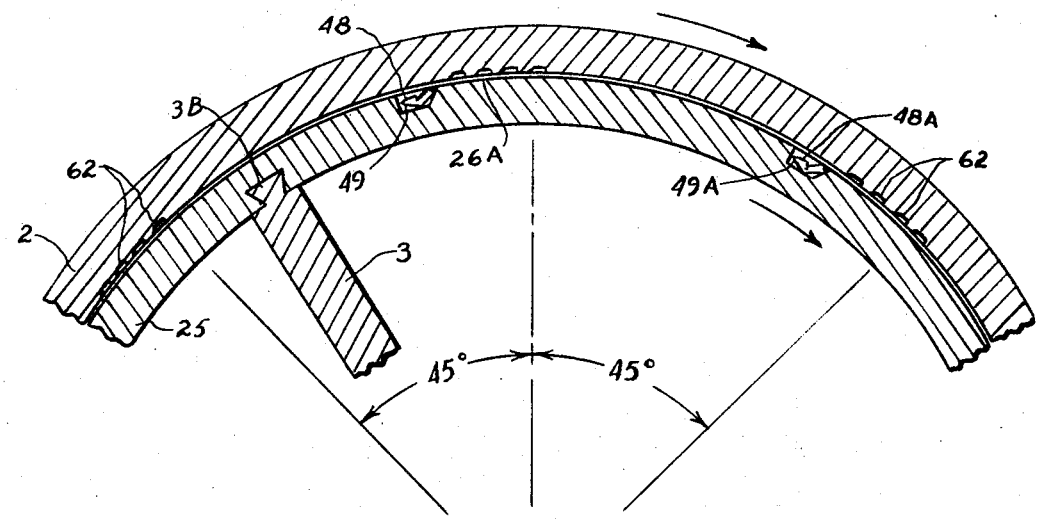
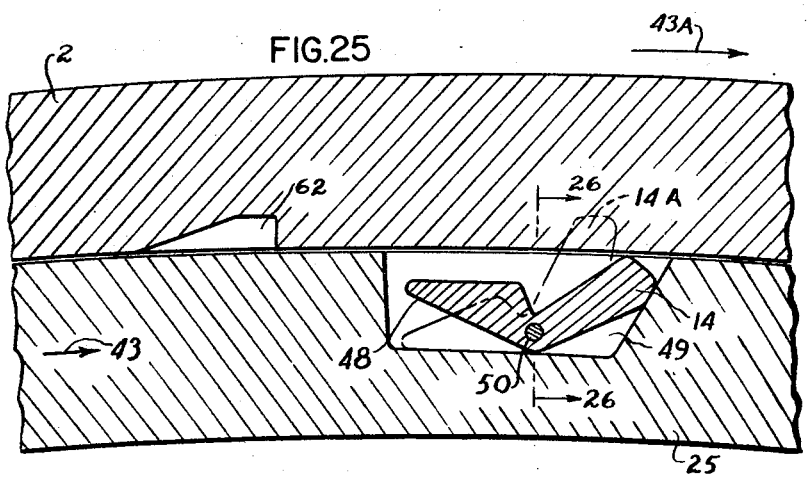
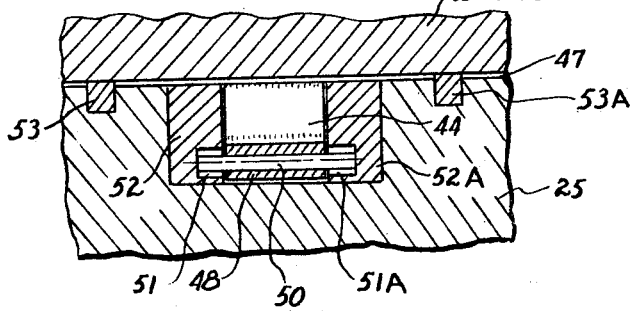
INVENTOR.
JOEL B. GUIN

INVENTOR.
JOEL B. GUIN

Aug. 20, 1968  J. B. GUIN  3,397,680
REVERSING BLADE ROTARY ENGINE
Filed April 19, 1966  13 Sheets-Sheet 11
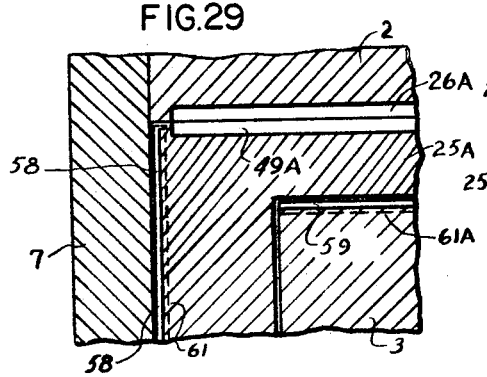
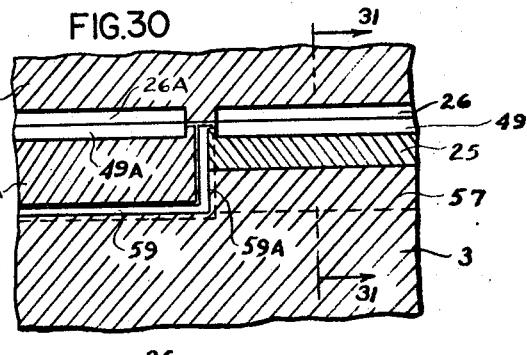
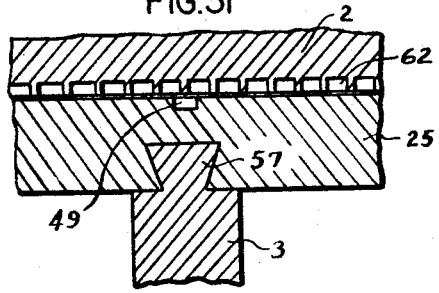
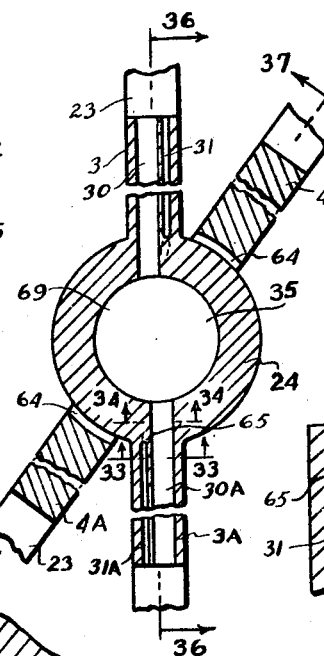
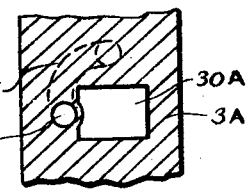
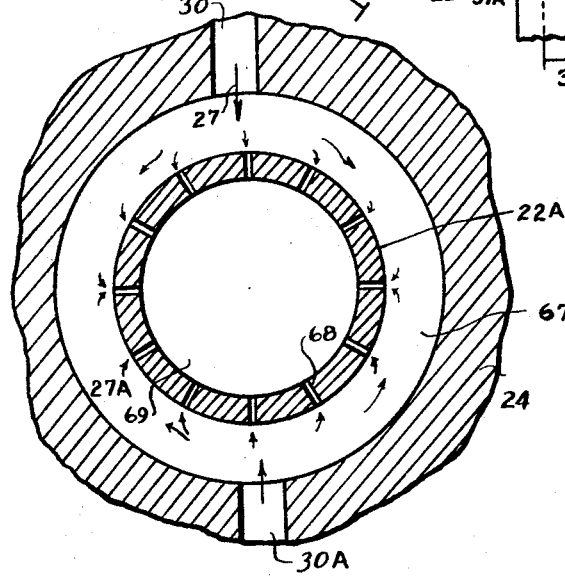
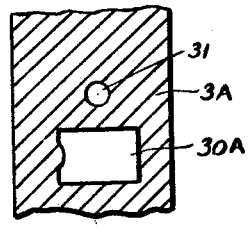
INVENTOR.
JOEL B. GUIN

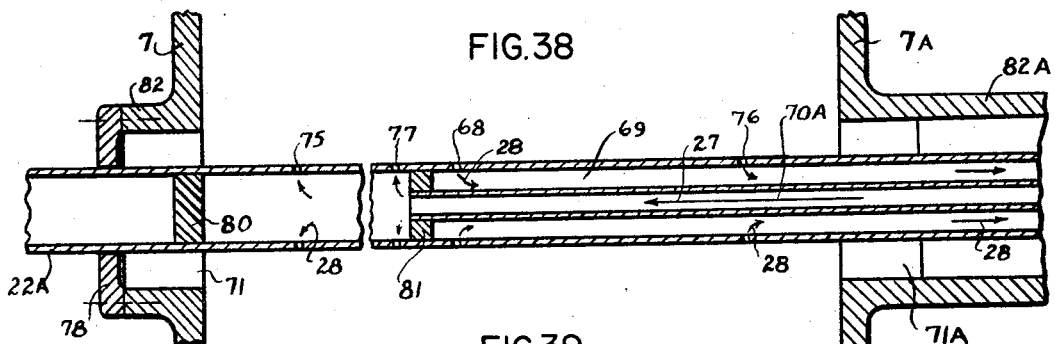
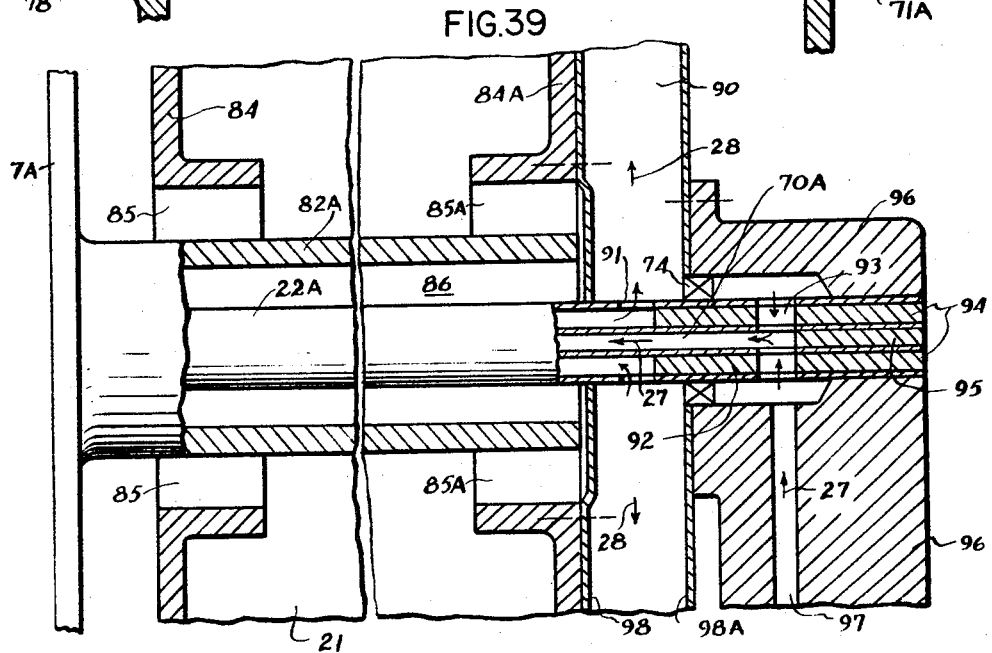
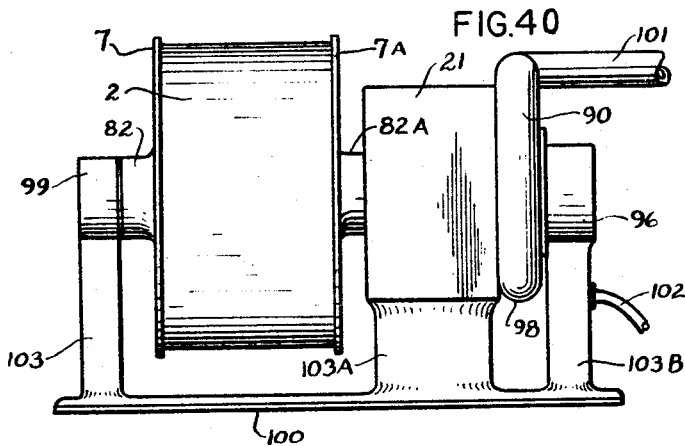

United States Patent Office 3,397,680
Patented Aug. 20, 1968

3,397,680
REVERSING BLADE ROTARY ENGINE
Joel B. Guin, 148 E. 48th St.,
New York, N.Y. 10017
Filed Apr. 19, 1966, Ser. No. 543,679
3 Claims. (Cl. 123—11)

ABSTRACT OF THE DISCLOSURE

This invention relates to an improvement in rotary internal combustion engines having a shaft, piston means and housing means, in which the piston means consists of two intersecting pairs of half blades, one pair rigidly mounted on opposite sides of a valve-containing annular shaped mid-section rotatably mounted on said shaft, and attached at two diametrically opposed places on the inside of an annular ring disposed around both pairs of half blades, the second pair being disposed on opposite sides of the mid-section from which they extend radially to said annular ring and being rigidly mounted on left and right to the walls of two circular plates rotatably mounted on the shaft to the left and right of the mid-section so as to complete, along with the adjacent arc of the annular ring and the two half-blades on either side, the four chambers in which the four strokes of the Diesel cycle—combustion (work), exhaust, intake (suction) and compression—take place simultaneously all four strokes taking place successively in each chamber. Channel means for introducing fuel and air (and water in one modification) and for exhausting combustion products, valve means for controlling the flow through the channels into and out of the four chambers, and bearing means, are disposed in the shaft, the mid-section and one or both pairs of half-blades. Injection means for fuel or fuel, water and air, are mountable either within the mid-section or one of the half-blades, the use of water with the latter injection means helping to improve combustion, decrease noxious combustion products, cool and clean the engine.

---

There are many permissible forms of this engine; only one will be completely described herein, the many others remaining within the over-all concept of the invention. Where two or three versions of the same part are about equally acceptable, they will be briefly described. The engine may operate on the spark ignition (Otto) or the Diesel principle. For the former, one channel for fuel and air may be adequate with a spark in each division for ignition but the Diesel principle requires separate channels for fuel and air, and an injector to shoot fuel into the air after it has been compressed to high pressure and temperature which ignite the fuel spontaneously. Primary attention will be paid to Diesel operation. A water channel to help cool the engine and reduce air pollutants will be described, but may be omitted. Three versions of fuel injectors are described: two of these inject supplemental air with the fuel in order to assist complete combustion and to increase turbulence; they start injecting water near the end of the fuel and air injection for the purpose of promoting complete combustion, of cooling the engine and reducing the amount of noxious emissions. Since the water is quickly turned to steam of 600 to 1200 times greater volume, a considerable augmentation of power is obtainable.

To complete the chambers for combustion, exhaust, intake, and compression, the main blade is attached at each end to a continuous annular ring or cylinder, and has at the center an enlarged cylindrical section through which the mainshaft passes. The other blade is divided into two parts each of which approaches this enlarged cylindrical section at its inner end and is attached on each side to one of two inclosing circular plates situated one on each side of the annular ring and the two blades. (Another version, having two half blades, each extending only from the shaft to the annular ring, one attached to the annular ring and the other attached on each side to the inclosing circular plates, is within the spirit of this invention but will not be described in detail.)

In one version, the peripheral movement of the blades may be controlled so that they return to the same position after each cycle, by two flat sealing rings holding cog wheels, one between the annular ring and the circular plate on one side, the other between the annular ring and the circular plate on the other side. Two small cog wheels, placed in niches 180 degrees apart in each of these rings and rotating on metal pins penetrating it, fit into cog teeth running circumferentially around both circular plates on the inside thereof and around both sides of the annular ring. If desired each metal pin may continue diametrically through the mainshaft through the opposite side of the sealing ring to the metal pin supporting the other cog wheel opposite: this gives even more control and stability. In another version the metal pin may end within or near the inner side of the seal ring. Both are described. The cog teeth insure that the distance moved by the annular ring in one direction equals the distance moved by the circular plates in the other: this exact, positive control of the engine makes it feasible to inject all fuel and air (also water and additives if used) into the chambers through the periphery instead of through the shaft as is described in the present specification. On the other hand, placing these channels within the shaft makes it possible to dispense with the sealing rings, cog wheels and the cog teeth if an engine with freely moving blades is desired.

The key to efficient operation of the engine lies in the valves and plumbing. A large number of practicable combinations are possible: valves and plumbing leading through the mainshaft into one blade or into both blades; some of the channels leading through the mainshaft, with others through injectors into the periphery; exhaust through one blade or through both blades into a channel through the shaft, or through openings into the chamber around the annular ring: neither these nor other combinations violate the spirit of this invention. In this specification most space is given to the following arrangement: exhaust channel through an opening in the periphery into the chamber surrounding the annular ring; channels for fuel, air, or fuel-air mixture (and for water and other additives if used) through the mainshaft into one or both of the blades.

The simplest arrangement is one providing for separate channels for air and fuel through the shaft into each blade, entrance being controlled by an appropriate valve which is depressed by exploding air from the combustion chamber. A spring pushes the valve back into the closed position as soon as the pressure is reduced.

More sophisticated valve arrangements provide for the admission of water and other additives as well as fuel and air, each through separate channels from the main shaft into either one blade or both blades. Four variations are described, each of which can be used with one-blade plumbing, or dual-blade plumbing: in the first, an opening for the explosion which is the activator in all versions, leads into a channel around the mainshaft, the channel being divided into a first part moving a tab attached to the valve ring which controls the opening and closing of the channels for fuel and air or fuel-air and water, and a second part which presses the plunger of a valve that opens the exhaust channel leading through an opening in the periphery. In the second variation, the plunger for the exhaust valve may be activated by a pin attached to a tab on the valve ring, so that the explosion in one chamber activates the exhaust valve leading from a second chamber and the valves controlling flow of fuel and air, or fuel, air and water channels into a third chamber. Compression takes place in the fourth chamber. In the third variation the channels are much shorter, leading only into fuel-air of fuel-air-water injectors enclosed within the enlarged part of the main blade. A fourth variation has a much larger fuel-air-water injector located farther out in the blade, the main purpose being to permit large amounts of water (and other additives) to be injected into the explosion chamber near the end of the fuel injection, the first water helping promote combustion and add power and the rest of the water being to cool the chamber and assist cleaning out the exhaust products at the end of the cycle.

Another key component is the injector. Three different modifications are described. The first is simple, providing only for fuel injection, the air, or air and water, being injected directly into the chamber from the channels. The second provides for fuel-injection, that is, for injection into two places a selected distance apart, of fuel, air and water simultaneously, in order to increase turbulence, speed flame propagation, promote complete combustion, prolong the period of maximum effective pressure, cool the engine and clean the combustion chamber. The third provides for a staggered injection of fuel, with air starting after an infinitesimal delay, and with water starting after most of the fuel and air have been injected. The delay for the air permits its fresh-oxygen effect to come when it is needed most. The delay for water prevents it from cooling the chamber and drowning the flame too soon; the late injection permits greater addition to power and cooling and cleaning of the chamber by a larger amount of water.

Of a large number of power take-off means, only three will be described, and no originality is claimed for two of these. The first involves toothed sections extending through the periphery and catching into correspondingly located notches in the surrounding chamber: the sections may be propelled outward by plunger activated by the explosion or by the exhaust gas, or both. The second involves toothed sections which are hingeably attached to the periphery of either the annular ring, or circular plate, or both, and activatable either by a plunger expelled by the explosion or by the exhaust gas, or both. The third involves single hinged tabs attached to the periphery which swing out into corresponding niches in the surrounding chamber under the force of gravity.

All the above are simple, but provide for power take-off in only one direction. The cogs between annular ring and circular plates take care of transferring the power in the other direction. A far more complicated method can be used, involving fastening the main blade to the shaft, which thus becomes a second power take-off. This method is envisioned for certain uses but will not be described in this application since the uni-direction power take-off is adequate for most purposes.

These objects and advantages will be obvious and others will appear when the specification is read in connection with the accompanying drawings in which FIGS. 1 and 2 show two successive positions of four key components of the invention, the annular ring and main blade attached on opposite sides thereto, the mainshaft running through an enlarged mid-section of the main blade, and the two halves of the other (intersecting blade).

FIGS. 9 and 10 are enlargements of section 9 in FIG. 1 showing a simple arrangement for an engine requiring two channels, two passages through the main shaft and two spring-valves to open and close the channels leading into each end of the blade.

FIG. 11 is a second modification of the area in section 9 of FIG. 1 with one version of a fuel injector and of a power take-off means.

FIG. 12 shows a third modification of the channel valves and a second version of the fuel injector.

FIG. 13 is a detailed section showing the fuel injector of FIG. 12 at the end of the injection cycle.

FIG. 14 is a sectional view of part of the main shaft and the contiguous part of the circular plate viewed from above.

FIG. 15 is a sectional view of the main blade, whose enlarged center area is shown in FIG. 16, between the two halves of the other blade which are attached to the circular plates on either side.

Figure 16:
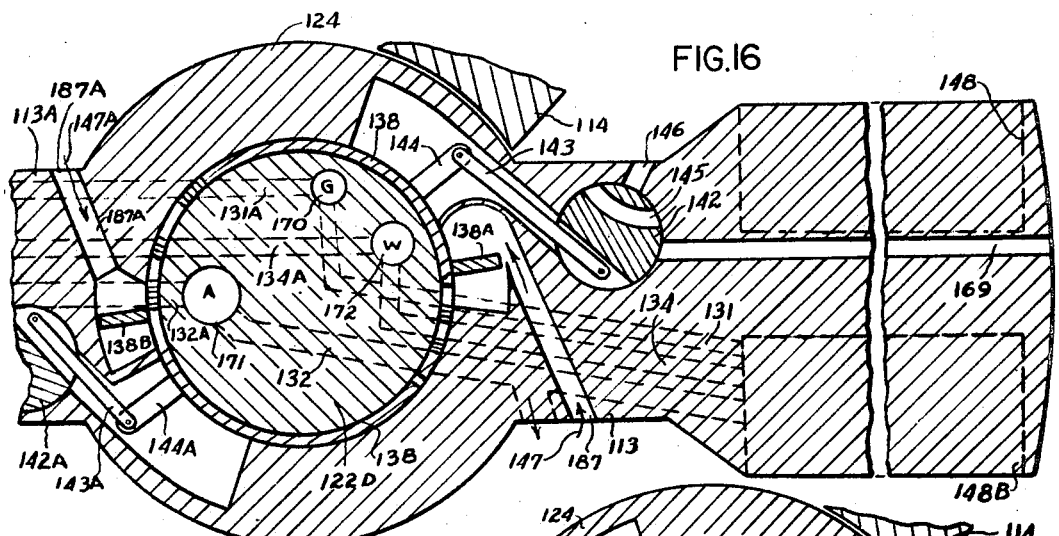
FIGS. 16 and 17 are sectional views of another version of area 9 in FIG. 1 giving a fourth modification of the valves for air, water and fuel channels and a third modification of exhaust channel valves.
Figure 17:
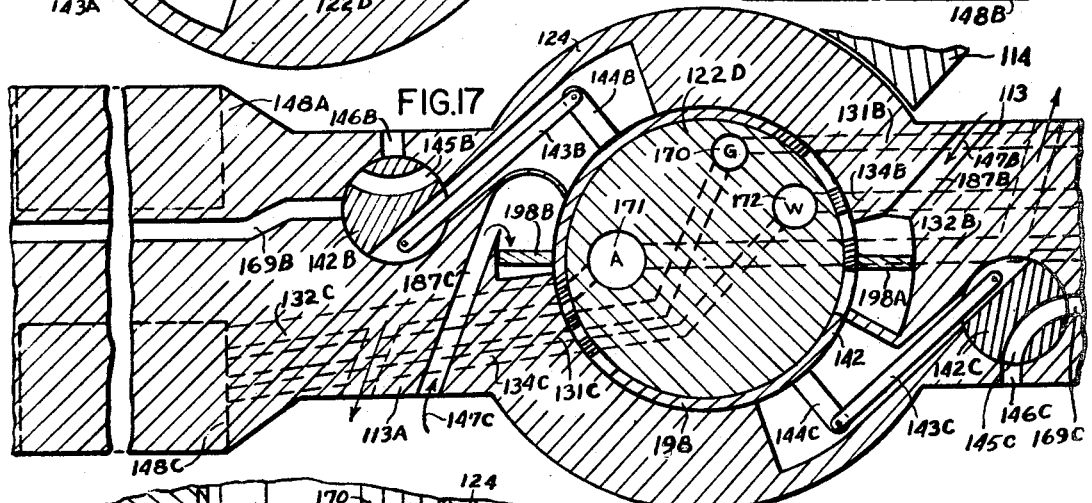
Figure 18:
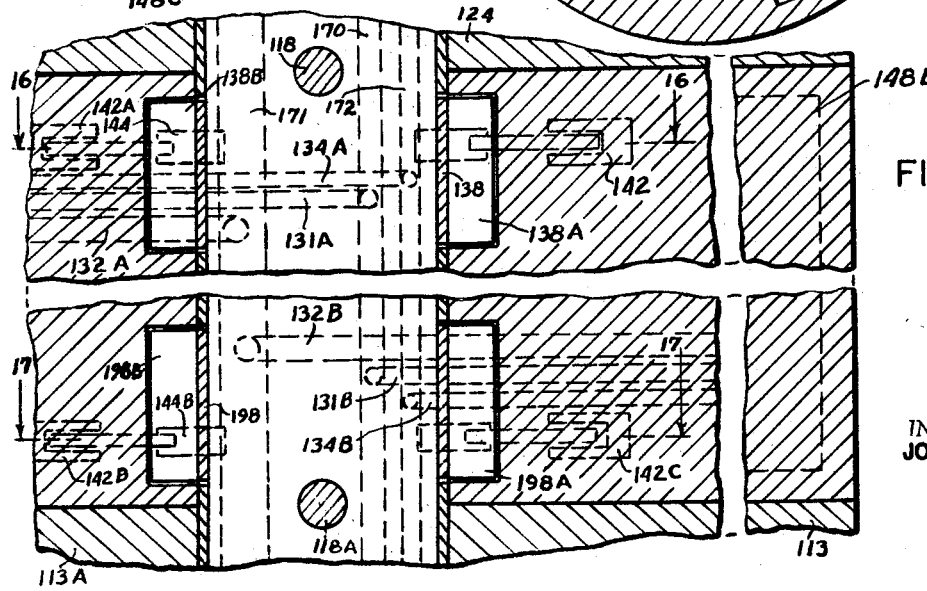

FIG. 18 is a top sectional view of the main blade along the lines 16—16 and 17—17 of which were taken the views shown in FIGS. 16 and 17 respectively.

Figure 19:
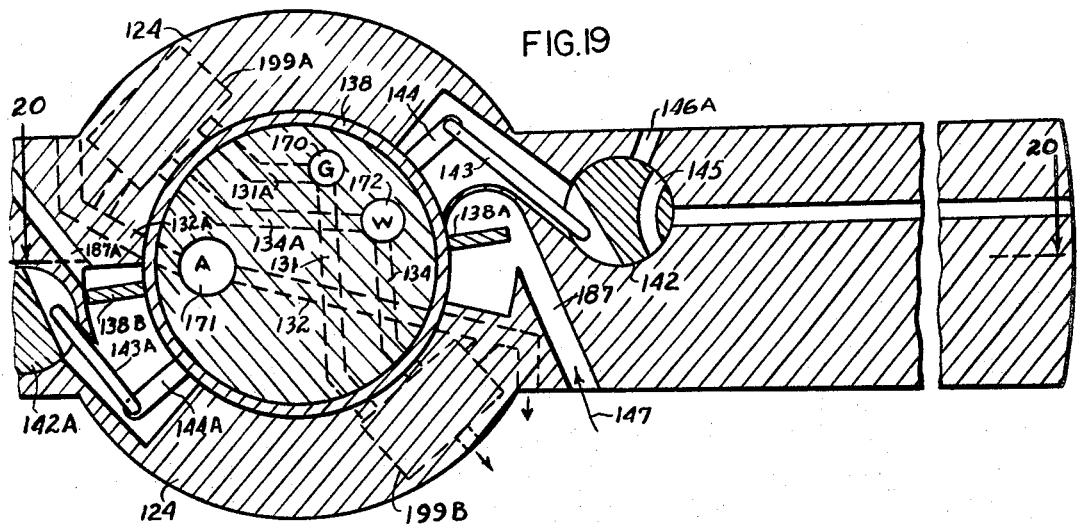

FIG. 19 shows in section a variation of the main blade of FIGS. 16-18 in which an air-water-fuel injector near the main shaft replaces the injector farther out in the main blade.

Figure 20:
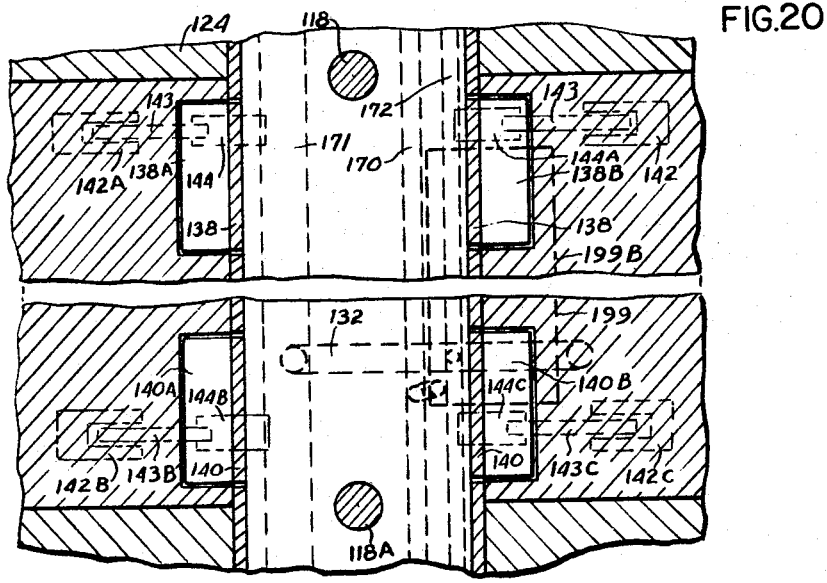

FIG. 20 is a top sectional view of the valve, channel and injector arrangement shown in FIG. 19 and is comparable to FIG. 18 with respect to FIGS. 16 and 17.

FIG. 21 is a second modification of the injector, providing for injection of fuel, air and water simultaneously from two places in the combustion chamber.

FIGS. 22 and 23 are "before and after" views respectively of a third modification of the injector, in which injection of fuel, air and water is slightly staggered in time.

FIG. 24 is a detail section of one version of the engine showing an arc of the annular ring having one modification of the power take-off means.

FIG. 25 is an enlargement of a section of the periphery of the annnular ring in FIG. 24, showing a catch that swings into a niche in the surrounding chamber wall when decelerated.

FIG. 26 is a vertical section along line 26—26 in FIG. 25.

Figure 1:
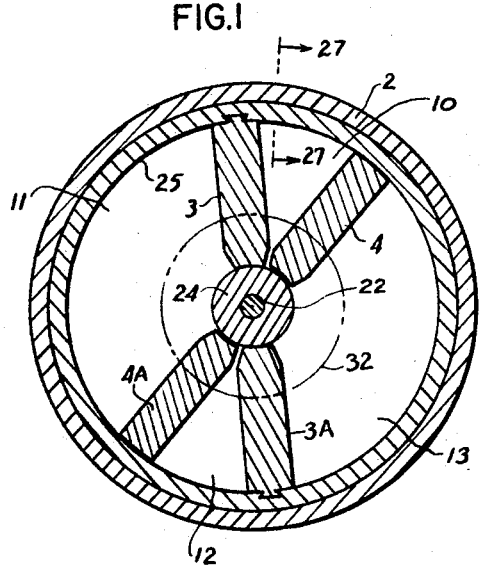
Figure 27:
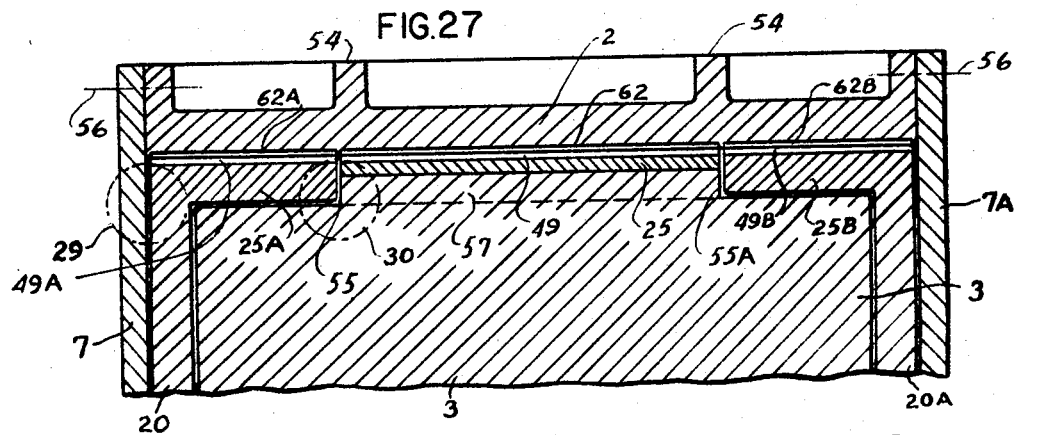

FIG. 27 is a section along line 27—27 in FIG. 1.

Figure 28:
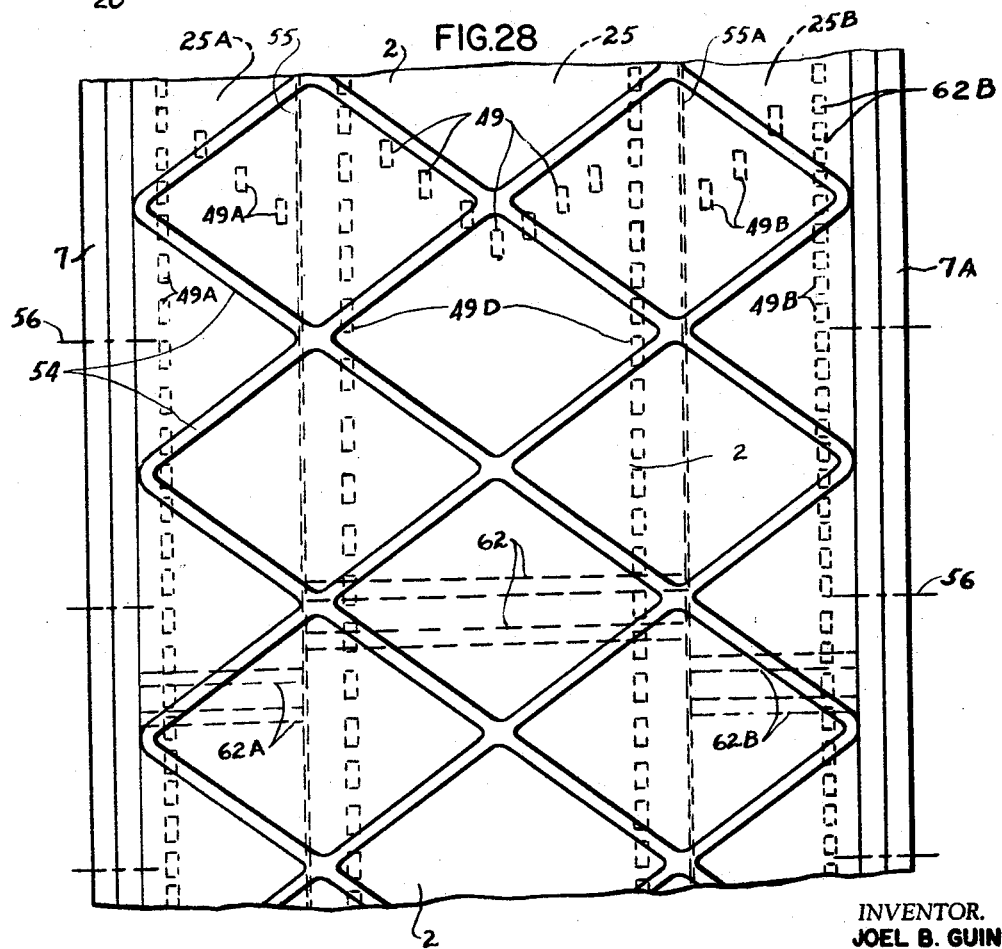

FIG. 28 is a top view of the engine showing stiffening ribs, catches and niches within the annular ring.

FIG. 29 is an enlargement of section 29 in FIG. 27, showing top and side sealings.

FIG. 30 is an enlargement of section 30 in FIG. 27, showing the sealing between two rings.

FIG. 31 is a vertical section along line 31—31 in FIG. 30.

FIG. 32 is an enlarged section of area 9 in FIG. 1, showing details of another arrangement of channels.

FIG. 33 is a horizontal section along line 33—33 in FIG. 32.

FIG. 34 is a horizontal section along line 34—34 in FIG. 32.

FIG. 35 is an enlargement of area 35 in FIG. 32 giving details of the shaft and exhaust inlet holes.

Figure 36:
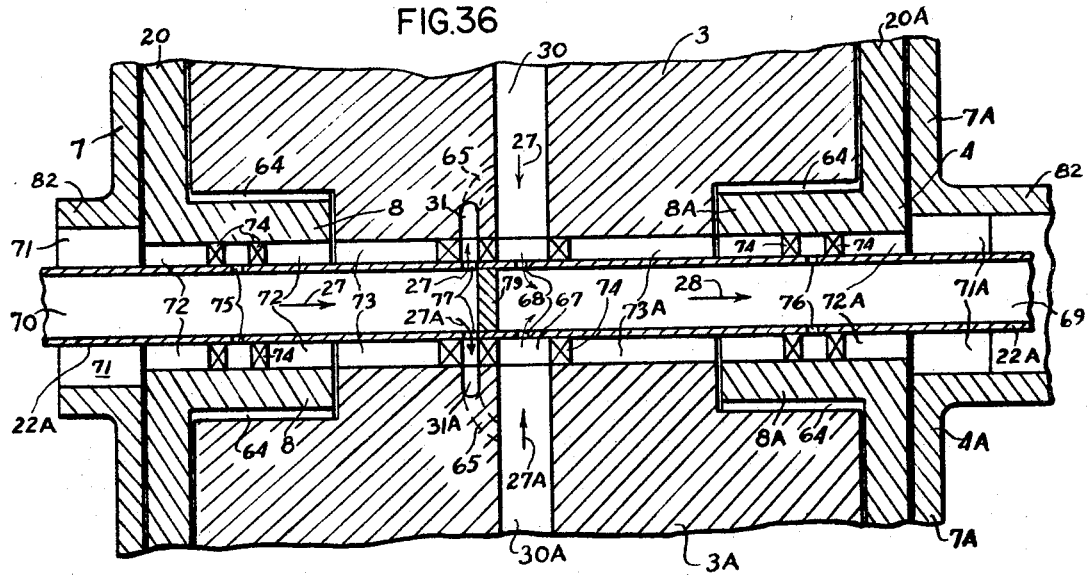

FIG. 36 is a section along lines 36—36 in FIG. 32, showing fuel and exhaust system near and within shaft.

Figure 37:
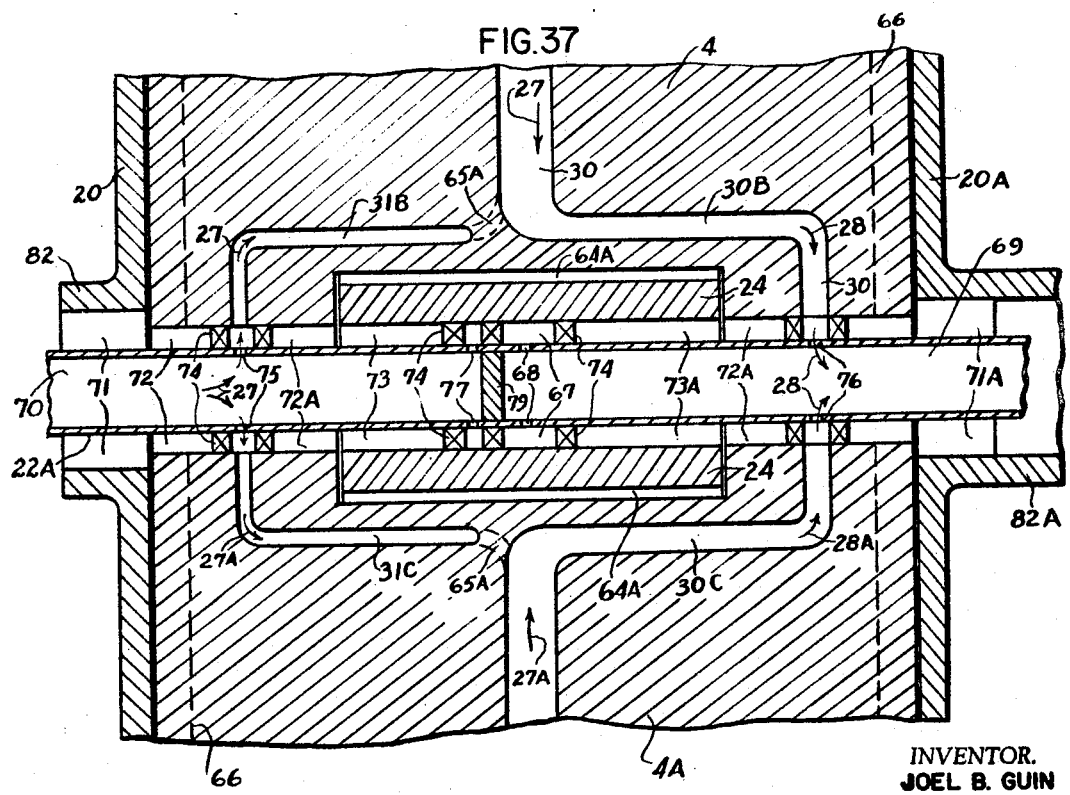

FIG. 37 is a section along line 37—37 in FIG. 32, showing fuel and exhaust system for the other blade.

FIGS. 38 and 39 show one modification of the fuel exhaust system within the shaft: in FIG. 38 the exhaust streams around a fuel channel, heating the fuel; in FIG. 39 the exhaust removal and fuel intake are shown.

FIG. 40 is a over-all view of one arrangement of the engine.

For clarity and simplicity, considerable liberty has been taken troughout; thus distances between and dimensions of parts are greatly exaggerated.

Figure 2:
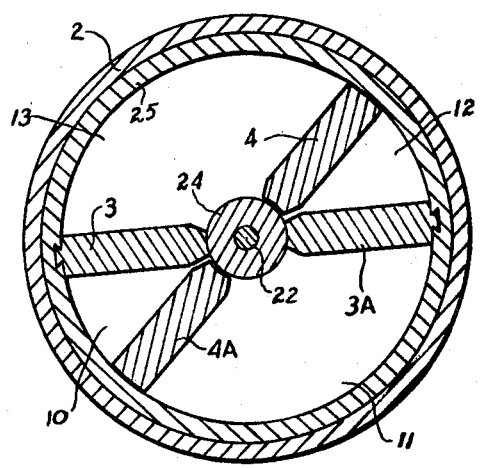

The preferred embodiment of the invention is described in FIGS. 1, 2, 3, 7–7C, 8, 8A, 11 and 13. Referring to the drawings, FIGS. 1 and 2 show the main blade, consisting of upper half 3 and lower half 3A, rotatably mounted upon main shaft 22, and attached at its ends to annular ring 25 which is rotatably contained within power take-off ring 2; and the intersecting blade made up of an upper half 4 and lower half 4A which move freely around valve section 24 of said main blade, both halves being attached at each side to one of two circular plates which close the sides of the chamber surrounded by the annular rings (20 and 20A in FIGS. 3, 4 and 27). The four cycles of the Otto engine take place in chambers numbered throughout this description thus: 10 for combustion, 11 for exhaust, 12 for intake and 13 for compression. After the first combustion, each chamber automatically takes up the next cycle, so that in FIG. 2, the same cycle shown by 10–13 has moved clockwise. A full description of the successive cycles is given in FIGS. 7–7C.

Figure 3:
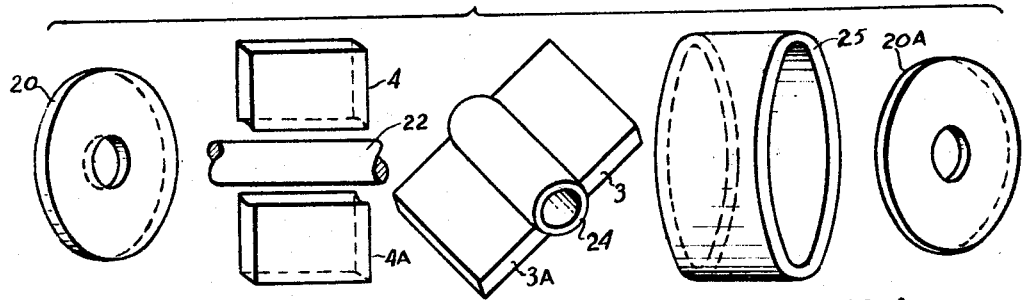
FIG. 3 is a substantially exploded view showing the principal parts of subject invention, including circular plates to close the various chambers.

FIG. 3 is substantially an exploded view showing approximate shapes of the main parts of the invention: left and right circular plates 20 and 20A; upper and lower halves 4 and 4A of the intersecting blade; main shaft 22, upper and lower halves 3 and 3A and valve section 24 of the main blade; and annular ring 25.

Figure 5:
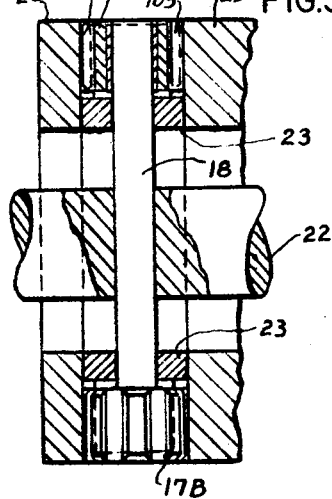
FIG. 5 is a complete side view, showing main shaft in elevation, and a set comprising two cog wheels in section, with a small shaft, on which both wheels rotate, in elevation.
Figure 4:
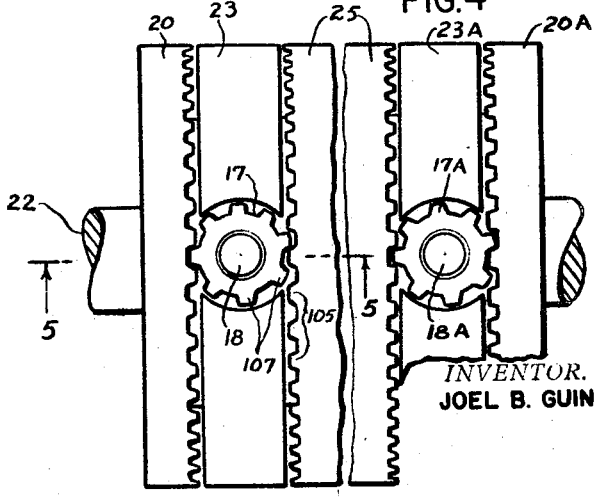
FIG. 4 is a top view of one modification of basic engine, incorporating two sets of cog wheels, each set being situated within a sealing ring positioned between the annular ring and a circular plate.

FIGS. 4 and 5 show the main parts, exaggerated in size, of a modification in which annular ring 25 has left and right sealing rings 23 and 23A separating it from the left and right circular plates 20 and 20A respectively. These sealing rings each hold two or more cog wheels. FIG. 4 is a top view showing cog wheels 17 and 17A mounted rotatably on the upper end of cog shafts 18 and 18A, within gaps in sealing rings 23 and 23A respectively. Cog shafts 18 and 18A may penetrate the inner part of the sealing rings, but in this version they extend through it and through main shaft 22, as shown in section and elevation view in FIG. 5. Cog wheels 17 and 17B rotate freely within gaps in seal ring 23 in the upper and lower ends of cog shaft 18 which extends through main shaft 22. The cog wheels give positive control over the movement of both annular ring 23 and circular plates 20 and 20A, and through them over the main blade and intersecting blade attached to them.

Figure 6:
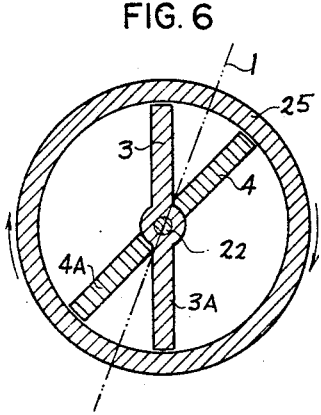
FIGS. 6 to 6C show schematically the engine using a "switch cycle" in which the air (or fuel-air for Otto engine) chamber and exhaust products chamber interchange across the axis of symmetry.
Figure 6A:
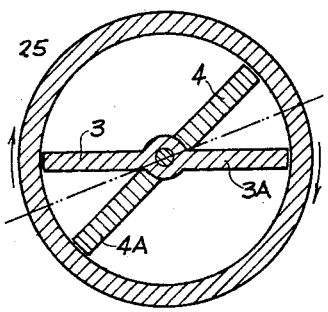
Figure 6B:
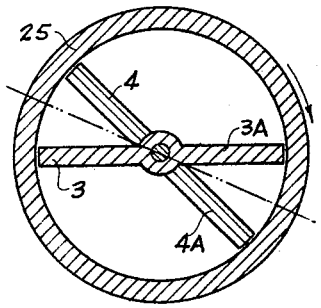
Figure 6C:
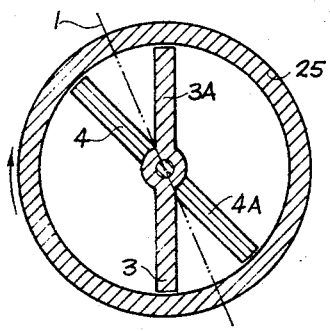

FIGS. 6 to 6C describe schematically the switch cycle of a Diesel version of the engine. The chambers in FIG. 6 between half-blades 4 and 3; 3 and 4A; 4A and 3A, and 3A and 4 are filled at the start of one cycle in this order respectively: combustion chamber 10 with compressed fuel and air; compression chmaber 11 with fuel and air at lower pressure; intake chamber 12 with the remains of exhaust products from the second cycle before; exhaust chamber 13 with the exhaust products of the previous cycle. The pressure and temperature in chamber 10 are so high that a Diesel-type explosion occurs.

In FIG. 6A half-blade 3 has been driven to the left, compressing the fuel, and half-blades 4 and 4A attached to annular ring 25 were driven to the right with the first explosion. Chambers 10, 11, 12 and 13 for combustion, compression, intake and exhaust are now the spaces between blades 3 and 4A, 4A and 3A, 3A and 4, and 4 and 3. Thus the chambers have crossed the axis of symmetry 1: this constitutes the "switch cycle." FIGS. 6B and 6C complete the four cycles.

Figure 7:
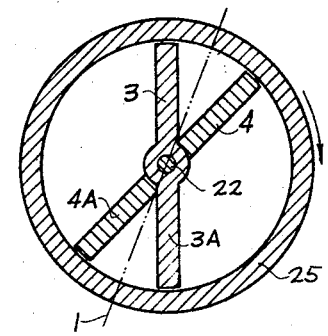
FIGS. 7 to 7C show schematically the engine using a "same-side cycle" in which the air (or fuel-air) chamber and exhaust products chamber stay on one side of the axis of symmetry.
Figure 7A:
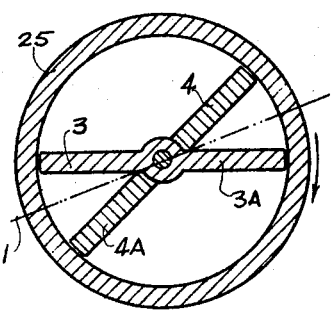
Figure 7B:
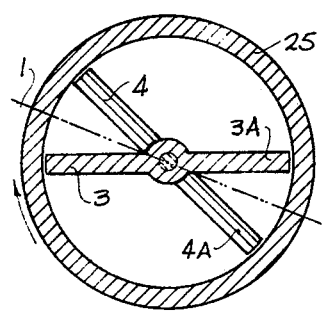
Figure 7C:
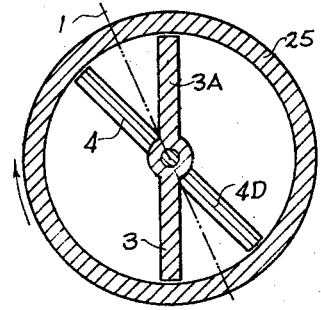

FIGURES 7–7C describe a succession cycle in which the various chambers stay on the same side of the axis of symmetry 1. The chambers for combustion, compression, intake and exhaust are numbered 10, 11, 12, and 13 respectively, and are located between half-blades 3 and 4, 4 and 3A, 3A and 4A, and 4A and 3 respectively. For the next stroke in the cycle, the chambers move clockwise, the chamber numbers 10, 11, 12 and 13 being located between half-blades 4 and 3A, 3A and 4A, 4A and 3, and 3 and 4 respectively. The next two strokes are detailed in FIGS. 7B and 7C and the complete cycle starts again at FIG. 7. Details of the preferred blade arrangement are given in FIG. 11.

Figure 8:
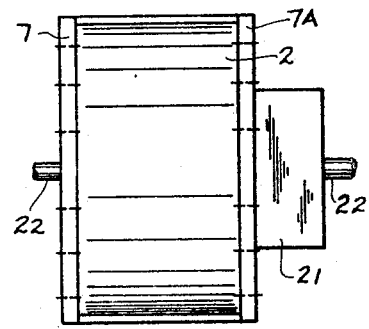
FIGS. 8 and 8A show two suggested shapes for an economical low-power engine using one intersecting blade assembly.

FIG. 8 shows a rectangular drum configuration: the annular ring 25 (FIGS. 1 and 2) is contained within power take-off ring (or drum) 2 attached on left and right to side plates 7 and 7A respectively.

Figure 8A:
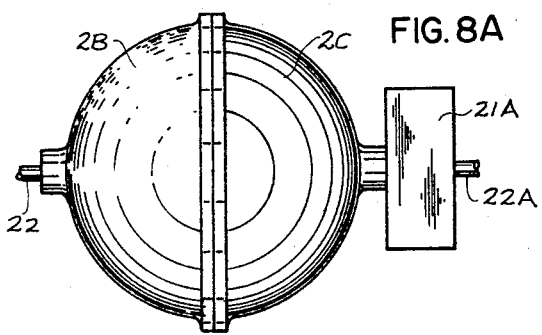

The engine is connected to gear box 21 by main shaft 22. This configuration will dominate the specification. However, for variety, FIG. 8A shows a spherical drum configuration with left and right half-spheres 2B and 2C respectively, connected to gearbox 21A by shaft 22A. This design is for installations using extreme compression ratios.

FIGS. 9 and 10 represent one version of a plumbing arrangement for the area 32 around mid-section 24 (other versions for engines in which a fuel-air mixture comes through a hollow shaft into the engine, and exhaust products exit through the hollow shaft, will be described in FIGS. 32 through 40). Upper and lower half blades 3 and 3A have fuel-air channels 31 and 31A respectively leading from cylindrical space 70 within hollow shaft 22A to the chambers separated by the blades (see 10–13, FIGS. 6–7C); exhaust exits 39A and 39B through which exhaust products, shown by arrows 28 and 28A respectively, pass from the same chambers into annular space 39 around hollow shaft 22A, and valve channels 34 and 34A leading to valves 35 and 35A respectively. In FIG. 9, valve 35 is open permitting fuel-air 27A to pass from space 70 through channel 31A and through valve opening 40, and exhaust 28A to pass from outside through valve opening 40A and channel 39B into annular space 39; valve 35A is closed. In FIG. 10, valve 35 has been closed by spring 35B when pressure was reduced; valve 35A has been opened by the pressure of the combustion which has overcome the spring 35C, allowing fuel-air from space 70 to pass through valve opening 41 and channel 31 into its chamber, and exhaust products 28 to pass from a chamber through channel 39B and opening 41A into annular space 39.

FIGURE 11 is the preferred embodiment of, and FIGS. 12–20 describe, various modifications of valves and channels; and FIGS. 21–23 describe two types of fuel-air-water injectors. Dozens of combinations of the elements are possible.

For convenience in notation, the last one or two digits will be used for reference characters in FIGS. 11–23 as for comparable parts in other figures throughout specification: thus, arrows for fuel are 127 and 127A and for exhaust are 128 and 128A whereas comparable arrows in FIGS. 27–39 are numbered 27, 27A, 28, and 28A respectively, and the four half-blades are numbered 113, 113A, 114 and 114A respectively, whereas in FIGS. 1–7A they were numbered 3, 3A, 4 and 4A respectively. FIG. 11 shows the preferred embodiment and FIGS. 12–15 various modifications of the upper and lower halves 113 and 113A of a main blade and upper and lower halves 114 and 114A of an intersecting blade, for an engine having no water injection. The main blade has a valve section, or mid-section 124 surrounding and supported by main shaft 122 and hollow shaft 122A between which is airshaft channel 171. Inside hollow shaft 122A is fuel shaft channel 170. Bearings 174 around main shaft 122 support the weight of the main blade and annular ring 125. Seals between mid-section 124 and upper and lower halves 114 and 114A are similar to seals 58 and 59 in FIGS. 29 and 30. Exhaust (arrow 147) from combustion chamber 10 streams through channel 130 against valve head 135A compresses spring 115A, pushes valve plunger 165A outward, allows exhaust (arrows 128A) from the previous cycle to stream through opening 179A in plunger 165A into lower exhaust channel 169A leading to the space between annular ring 125 and power take-off ring 102A. Both actions push catch-arc 159A outward causing its double rows of catches 182 and 182A to engage complementary rows 162 and 162A on the inside of power take-off ring 102A propelling it (via half blade 113A) clockwise. Bearing 188, exaggerated in thickness, has a cut-out space in which valve 137 moves freely.

Part of combustion gases (arrow 147) from chamber 10 is directed by partition 175 into channel marked by arrow 116 against ring-tab 137A; this causes valve-ring 137 to turn counterclockwise to position shown, which permits fuel from shaft channel 170 to pass through opening 160 in valve ring 137 into blade fuel channel 131A on its way to fuel injector 149A; it also permits air from the annular space 171 to pass through opening 161 into blade air channel 132A on its way to intake chamber 12. Compressed air in air chamber 117 in the fuel-injector returns container 126 to place after the pressure in the combustion chamber is reduced; this closes opening 119 till the next cycle. The force of the explosion in combustion chamber 10 moves the main blade clockwise and the interconsecting blade counter-clockwise forcing exhaust products in exhaust chamber 11 through opening 179A in plunger 165A as described above, and compresses the air compression chamber 13 between main upper half-blade 113 and intersecting lower half-blade 114A, the latter containing fuel injector 149C (FIG. 13) which has received fuel through channel 131C in left side-plate 120 in FIG. 14 (not shown, since it is above plane of drawing; detailed action will be described with fuel injectors shown).

At the same time intake chamber 12 between main lower half blade 113A and intersecting lower half blade 114A is enlarged, causing air from main shaft channel 171 which has passed through opening 161 and blade channel 132A to be sucked in (arrow 129A), the pressure depending on the pressure in main shaft channel 171.

This first cycle closes as the pressure in compression chamber 13 rises between said half-blades 113 and 114A, causing air to pour into opening 180C in fuel injector 149C (FIG. 13). This pressure forces valve plunger head 157C against valve spring 163C, pushing plunger 158C and valve head 156C and the legs attached thereto, around fuel-emptier 155C, thus expelling fuel in chamber 183C outward through 3-hole injector outlet 154C as shown by arrows 127C.

The elevated pressure and temperature causes Diesel-action ignition of the fuel, this constituting the second cycle, as space between main upper blade 113 and intersecting lower blade 114A becomes combustion chamber 10 comparable to the changes that took place as the blades in FIG. 7A assumed the positions in FIG. 7B. Simultaneously the space between upper half-blades 114 and 113 becomes exhaust chamber 11, space between main lower half-blade 113A and intersecting half-blade 114 becomes intake chamber 12 and space between intersecting lower half-blade 114A and main lower half-blade 113A becomes compression chamber 13 (refer to description of FIGS. 7-7C, the repetition or "same-side" cycle). The valves and channels necessary to carry out the various functions of cycle 2 are comparable to those in FIGS. 11-15 but are in a place farther over in the main and intersecting blades and are thus not shown. The action is similar to that described in FIGS. 16-20.

At the end of cycle 2, the fuel in compression chamber 13 (between intersecting lower half-blade 114A and main lower half-blade 113A) ignites by Diesel action starting cycle 3 in which combustion 10, exhaust 11, intake 12 and compression 13 chambers are in order, spaces between said half-blades 114A and 113A, half-blades 113 and 114A, 114 and 113, and 113A and 114 respectively (see FIG. 7C). For this the required plumbing is again shown in FIGS. 11-15. The explosion simultaneously drives the blades apart (main blade clockwise and intersecting blade counter-clockwise) with catches 182 on catch-arc 159A attached to plunger 165A engaging catches 162 on the inside of power take-off ring 102; and blasts into channel 130A (in mid-section 124) where it pushes valve 135 upward against spring 115 permitting exhaust products to pour through opening 169 (not shown) in plunger 165; the same blast (arrow 116A) then pushes tab 137B on valve ring 137 causing it to turn clockwise and bringing openings 160A and 161A in line with the blade channels 131 and 132 for fuel and air respectively, leading to fuel injector 149 and intake chamber 12 respectively (FIG. 12). The plumbing for cycle four is the same as that for cycle 2.

Several variations are presented in FIG. 12; valve ring 137 and tabs 137A and 137B have been eliminated; fuel injector 149 has two instead of three outlets; plunger 165 has an additional opening 123 that permits exhaust products to depress a valve 136 to allow air (arrow 129) from shaft channel 171 to flow through blade channel 132 into intake chamber 12; and fuel to flow through channel 131 to fuel injector 149 (the fuel valve, similar to air valve 136 not being shown since it is on the portion of fuel channel 131 shown by broken lines). Fuel injector 149C in FIG. 13 operating on the same principle as injector 149 in FIG. 12, shows the position of all components when nearly all of the fuel has been expelled from fuel chamber 183C through opening 152C and outlets 127C.

FIG. 14 is an elevation sectional view of parts of side plate 120 and the intersecting upper and lower half-blades 114 and 114A atached to it, and FIGURE 15 is a section of the comparable portion of the main blade, showing comparable positions of components of the two blades and other versions of the plumbing in valve section 124D, and of the power take-off arrangement. In FIG. 14 the components within shaft 122 are similar to those in FIGS. 11-12 Since intersecting half-blades 114D and 114E are not connected with valve section 124D (a part of main half-blade 113D and 113E) but rotate around it, the fuel, air (and water, if used) channels must be routed from shaft channels 170 and 171 through plate channels 131E and 132E (in side plate 120) to fuel chamber 183D in fuel injector 149D and outlet 129E and half-blade 114D respectively. Fuel injector 149D in FIG. 14 operates in the same way as injector 149B shown in side view in FIG. 15. Fuel in chamber 183D is expelled by pressure of air in compression chamber 13 (see FIGS. 6-7C) against plunger head 157D forcing valve structure 156D downward around fuel-emptier 156D against air in air chamber 185D, the fuel spraying through the holes in outlet 154D (arrow 127 in outlet 154B, FIG. 15). Diesel action ignites the fuel and after the pressure is reduced the compressed air 185D pushes structure 156D upward thus closing this fuel injector during the next two stages. (Each of the four half-blades has its own fuel injector and separate plumbing attached to it.)

The plumbing in FIG. 15 is similar to that in FIG. 11. Plungers 165D and 165E are activated by arms 164 and 164A (to which they are movably attached) which are attached movably to tabs 167 and 167A respectively, the latter being fixedly mounted on valve ring 137 so that pressure of explosion gases (arrows 147D and 147E) on ring tabs 137D and 137E respectively will automatically activate the plungers 165D and 165E, bring exhaust openings 166D and 166E in line with openings for exhaust channels 169D and 169F, and push outward catch-devices 159D and 159E with catches 162D and 162E till they engage catches 182D and 182E respectively, extending from the inside of power take-off ring 102, which is impelled clockwise thereby. Catches 159D and 159E are mounted upon annular ring 125D by pivots 186D and 186E. Components 159E, 162E and 186E are on the unshown part of half-blade 113E.

FIGS. 16–20 present a more sophisticated version of the plumbing around valve section 124, presents new arrangements for the main shaft, adds a channel for water, and shows new types of exhaust valves and fuel injectors, but the movements of the half-blades with respect to the annular ring 125 and power take-off ring is the same as that described in FIGS. 6–7C and FIGS. 11–16, and will not be repeated in detail. The chief difference is that all plumbing is in the main blade, which simplifies construction of the side plates 7 and 7A, and intersecting half-blades 114 and 114A. Combustion, exhaust, intake and compression chambers are located succesively in spaces between main half-blades and intersecting half-blades using either the switch or same-side (repetition) cycle as described in FIGS. 6–7C. Referring to FIG. 18 it will be seen that FIG. 16 is a section along line 16—16 and FIG. 17 a section along line 17—17 in FIG. 18.

Explosion gases from the combustion in the same-side cycle enter in successive stages into channels 187, 187A, 187B and 187C, as shown by arrows 147, 147A, 147B and 147C, where they impinge on valve ring tabs 138A–138B and 198A–198B respectively which are attached to valve rings 138 and 198 respectively. These valve rings surround and move freely in slots around main shaft 122D through which run shaft channels G (for fuel) 170A (for air) 171 and W (for water) 172: connected to these and extending therefrom in FIG. 16, are blade channels (on the right) 131 for fuel, 132 for air and 134 for water, all leading to fuel injector 148B, and on the left blade channels 131A for fuel, 132A for air and 134A for water, leading to fuel injector 148A (broken lines, FIG. 17); connected to these and extending therefrom on the right in FIG. 17 are blade channels 131B for fuel, 132B for air, 134B for water, leading to fuel injector 148 (broken lines 148, FIG. 16) and on the left blade channels 131C for fuel, 132C for air and 134C for water leading into fuel injector 148C. Observe that blade air channels 132, 132A (not shown) 132B and 132C have one outlet into fuel injectors 148B, 148A, 148 and 148C respectively, and another outlet to the respective intake chambers (see FIGS. 6–7C).

Mounted fixedly upon valve rings 138 and 198 are ring-arms 144–144A and 144C–144B respectively to which are movably attached arm-bars 143, 143A, 143C, and 143B respectively, connecting with round valves 142, 142A, 142C and 142B respectively; these round-valves are moved by said valve rings acting through said ring-arms and arm-bars whenever combustion gases flow from the respective combustion chambers through said channels 187, 187A, 187B and 187C, and this movement brings them into alignment with exhaust channels 146, 146A (not shown), 146C and 146B respectively (according to the firing order which depends upon use of the switch or the same-side cycle); said alignment permits exhaust gases from the appropriate exhaust chamber (see FIGS. 6–7C) to pour through said exhaust channels into exhaust channels into exhaust pasages 169, 169A (not shown), 169C and 169D respectively, whence they pass into the space between annular rings 125 and power take-off ring 102A (see FIG. 11).

FIG. 19 is a section through the top part of FIG. 20, and FIG. 20 is a section taken along line 20—20 in FIG. 19 (the same relation as between FIGS. 16 and 18). FIG. 19 is substantially the same as FIG. 16 except that smaller fuel injectors 199B and 199A in valve section 124 replace fuel injectors 148B in FIG. 16 and broken lines 148A in FIG. 17 (to avoid confusion, observe that fuel injectors 148-158B and 148A–148C in FIGS. 16 and 17 extend transversely across a good portion of the main-blade whereas none of the fuel injectors 199B–199A in FIG. 19 and 199–199C (not shown) extend beyond the mid-line of the blade. The capacity of the latter is obviously less. Another drawing could be drawn showing the section through the lower part of FIG. 20, but it would show no more than FIG. 17 with respect to FIG. 18 and is not drawn). The main object of FIGS. 19 and 20 is to show another arrangement for the fuel injector. Observe that air channels 132 and 132A are designed to send one stream of air into fuel injectors 199B and 199A respectively, and another directly into the appropriate intake chambers (FIGS. 6–7C).

To illustrate the operation through one stage, start with combustion chamber 10 between main upper half-blade 113 and intersecting upper half-blade in FIG. 17. Using the "same-side" cycle (FIGS. 7–7C), during the first stage, exhaust chamber 11 would be between intersecting upper half-blade 114 and main lower half-blade 113A, intake chamber 12 would be between main lower half-blade 113A and intersecting lower half blade 114A (not shown, but opposite 114; as in FIG. 11), and compression chamber 13 would be between intersecting lower half-blade 114A and main upper half-blade 113.

At the instant the fuel ignites in combustion chamber 10, explosion gases 147B shoot through channel 187B against ring tab 198A forcing valve ring 198 clockwise, along with ring arm 144B and arm-bar 143B; this causes round valve 142B to move counter-clockwise and bring opening 145B in alignment with exhaust opening 146B, which permits exhaust gases from exhaust chamber 11 to stream through exhaust passage 169B against catch arc 159A (FIG. 11), this being another way to engage catches 162 and 162A attached to power take-off ring 102A. Simultaneously half-blades 113 and 114 and 113A and 114A will thrust apart allowing air from air passage 132C to stream directly into intake chamber 12 and air, fuel and water to flow into injector 148C through air, fuel and water channels 132C, 131C and 134C from shaft channels A (171), G (170) and W (172) respectively, because the openings in valve ring 198 were brought in line with said passages. (Space is too limited to show these valve openings clearly in FIGS. 16 and 17; see the openings for passages 132B, 131B, and 134B; and FIGS. 11 and 15 for greater detail.)

Observe that in engines using diesel-type combustion, fuel flows into the injector 148C (also 148, 148B and 148A) not into the intake chamber; it is in the compression stage that pressure of the air forces fuel—also more air, and water, if used—from the injector into the compression chamber; but in engines using the Otto Cycle fuel and air both enter the intake chamber.

As half-blades 113–114 and 113A–114A thrust apart, half blades 114–113A and 113–114A come together, the former causing expulsion of exhaust gases from exhaust chamber 11, the latter compressing the air in compression chamber 13 (between 113 and 114A) up to the point of ignition when the space between 113 and 114A will become combustion chamber 10 of a new cycle. The same process continues indefinitely, and in same-side cycle engine chambers 10, 11, 12, and 13 keep on progressing clockwise, 10 replacing 13 (as above), 11 replacing 10, 12 replacing 11, and 13 replacing 12, as in FIGS. 7–7C; for the switch cycle refer to FIGS. 6–6C. Observe also that valve ring 198 opens the passages for 2 of the four stages in every cycle, but that valve ring 138 in FIG. 16 is essential for the other two stages; in stage one of the cycle (just described), tab 198A on valve ring 198 opens them; for stage two, tab 138A on valve ring 138 opens them; for stage three, tab 198B on valve ring 198 opens them; for stage four, tab 138B on valve ring 138 opens them; and the next cycle would start with stage one using tab 198A on valve ring 198 again opening the passages for air, fuel, water and exhaust gases.

FIGS. 21–24 present two new versions of an injector for fuel, air and water particularly designed for the blades in FIGS. 16-20; but also adaptable for use in any other modification of an engine using diesel combustion.

In FIG. 21, dual injector 148E has two exits (arrows) for fuel, air, and water (arrows 127E, 129E and 194E respectively) after they have been forced through nozzles 201 and tubes 209 and 204 leading from chambers 183E, 195E and 193E, for fuel, air and water respectively; the entry into these chambers is through fuel, air and water channels ending at 131E, 132E and 134E respectively, which are filled during the intake stage. When the air pressure in the combustion chamber between the two rapidly approaching blades rises, partitions 196B, 196C and 196D on left and right, each of which is held together by connecting structures 196 and 196A on left and right, are forced inward toward the center: this causes fuel 127E to spray through nozzles 201, air 129E to pour through tubes 209 (further atomizing the fuel) and some water to come through tubes 204; in a few milliseconds the fuel ignites; the explosion blasts the framework 196 and 196A supporting and holding plates 196B, 196C and 196D (which are held together by structures 196 and 196A which penetrate injector partitions 200A, 200B, 200C and 200D) inward into chambers 183E, 195E and 193E for fuel, air and water respectively. The nozzles or outlets for the fuel, air and water are arranged to give the greatest atomization of fuel and the greatest turbulence, thus speeding propagation of the flame front. To delay expulsion of water, frameworks 196 on left and right may have telescoping sections (with circular springs pressing them apart) to temporarily absorb the shock of the explosion. The water can serve four functions, and the injector can be varied to emphasize either: the first small amount of water (steam within milliseconds) assists combustion; a larger amount of water gives power since each quantum expands 600 times when turned to steam at 212 degrees Fafrenheit (and many times that at 1800-2000 degrees); still larger quantities cool the engine, help clean it and help reduce pollutants.

Another way of increasing flexibility in the injector and of delaying expulsion of most of the water is shown in FIGS. 22 and 23. This variation has a single exit, but could be made into a double-injector such as FIG. 21 by attaching a mirror image of the single-injector 148F on the left and redesigning the plumbing.

Explosion gases (arrows 147F) blast through opening 187F, surround concentric tube channels 211-202-204F against nest-structure 197 pushing it to the left; this forces fuel (arrow 127F) in chamber 183F into annular-shaped channel 131F, hence out into the combustion chamber. The shock is transmitted by the fuel in chamber 183F to nest-structure 197A, forcing air (arrow 129F) in chamber 195F through annular channel 132F and out through exit 129F, helping to further atomize the fuel and increase turbulence in the combustion chamber. The air in chamber 195F absorbs most of the shock, but pressure is transmitted by the compressing air against nest-structure 197B, forcing it to the left; this forces water (arrows 194F) in chamber 193F out through center channel 204F into the combustion chamber.

FIGS. 24-39 describe details of a modification which could be used in a high power engine, but was particularly designed for a low-power application using rather simple plumbing.

FIG. 24 is an enlargement of an arm from the top of FIG. 1. Annular ring 25 has recesses 49 and 49A in its periphery, their location constituting a pattern that will permit catches 48 and 48A to engage one of grooves 62 running across power ring 2 when deceleration of half-blade 3 causes inertia to swing upper part 14 of catches 48 and 48A outward to position 14A (in broken lines). Grooves 62 are placed in such a way with respect to recesses 49 that when one catch 48 or 48A is locked into a groove it will be balanced by another catch locking into a groove 180 degrees around ring 2; this balances forces, and reduces strain on the other parts. The upper half 3 of the main shaft has its end 3B locked into a corresponding recess in annular ring 25.

FIGS. 25 to 27 show details of FIG. 24. FIG. 26 is taken along line 26—26 in FIG. 25. Annular ring 25, turning leftward from the previous stage has a recess 49 containing catch 48 which pivots on pin 50 whose left and right ends fit into spaces 51 and 51A in supports 52 and 52A respectively, which are easily removable to expedite replacement of worn or broken catches. When the leftward movement of annular ring 25 is stopped by the explosion (see chamber 10, FIGS. 6-7C), the back 14 of catch 48 tries to move upward due to inertia and centrifugal force to position 14A (broken lines); when it encounters any groove 62, upper part 14A is inserted in it and the immediately ensuing movement to the right (arrow 43) becomes a power stroke, catch 48 forcing power take-off ring 2 to the right (arrow 43A). Two circumferential, and optional, sealings 53 and 53A decrease axial leakage through slit 47 between the two rings. Such sealings would not be used with the modifications envisioned in FIGS. 12-20.

FIG. 27 is a section taken along line 27—27 in FIG. 1 showing upper half 3 of the main blade which has shallow-tail extension 57 and is attached to annular ring 25, cut into which are recesses 49 containing catches 48 and 48A (FIG. 25) designed to fit into grooves 62 in ring 2. Side-rings 25A and 25B on the left and right respectively, have on their peripheries recesses 49A and 49B containing catches 48A and 48B respectively which are designed to fit respectively into grooves 62A and 62B cut in power ring 2. Slits 55 and 55A are located between annular ring 25 and side rings 25A and 25B on the left and right respectively. Ring 2 has optional stiffening ribs 54 and is attached to side plates 7 and 7A by screws 56. Observe that circular plates 20 and 20A are separated from main half blades 3 and 3A whereas they constitute the foundation upon which are rigidly attached intercepting blades 4 and 4A (see broken lines 66, FIG. 37).

FIG. 28 is a top view of power take-off ring 2 held between circular plates 7 and 7A by screws 56 and having a grid of stiffening ribs 54. There will be shown only two of each set of grooves 62, 62A and 62B which are designed to receive catches 48, 48A and 48B (not shown) located in recesses 49, 49A and 49B within the annular ring 25 and side-rings 25A and 25B respectively. other similar grooves are selectively placed around the peripheries of said rings. Broken lines 55 and 55A represent the slits between these rings (FIG. 27). The chief purpose of FIG. 28 is to show two possible pattterns for the recesses within side-rings with respect to power take-off ring 2. Recesses 49, 49A and 49B for catches 48, 48A and 48B respectively are staggered in echelon, and over-lap to reduce to a minimum the distance between any two catches. Another of many possible patterns shows recesses 49E and 49F on left and right within side-rings 25A and 25B respectively and recesses 49D within annular ring 25, all in continuous circumferential rows around the rings. In all cases the catches 48, 48A and 48B within the recesses are designed to catch in the appropriate grooves on the inner side of power take-off ring 2.

FIG. 29 is an enlargement of section 29 in FIG. 27 showing side sealings 58 for ring 25A and top sealing 59 for half-blade 3, which are inserted as indicated by broken lines 61 and 61A respectively.

FIG. 30, an enlargement of section 30 in FIG. 27, shows top sealing 59 and side sealing 59A in relation to annular ring 25, side-ring 25A and main half-blade 3.

FIG. 31 is a vertical section along line 31—31 in FIG. 30 showing dove-tail extension 57 that locks main half-blade 3 into ring 25, and cross-ring grooves 62 which receive the catches 48 in recesses 49.

FIG. 32 is an enlargement of one version of section 32 in FIG. 1 showing the portions of the half-blades around the valve section and hollow shaft. Main half-blades 3 and 3A are connected to main shaft mid-section 24, from which half-blades 4 and 4A of the intersecting blades are separated by means of bearing 64. Fuel-and-air mixture and exhaust channels 31 and 31A, and 30 and 30A respectively connect with the main shaft.

FIG. 33 is a horizontal section along line 33—33 in FIG. 32 showing exhaust channel 30A and fuel-air channel 31, the latter having curvature 65 because channels must enter the shaft on the same axial line.

FIG. 34 is a horizontal section along line 34—34 in FIG. 32 showing fuel-air and exhaust channels 31 and 30A respectively before they enter the main shaft valve section.

FIG. 35 is an enlargement of section 35 in FIG. 32 showing the connection of exhaust channels 30 and 30A to hollow shaft 22A. The exhaust first streams into annular chamber 67 (FIGS. 36 and 37), thence through holes 68 in hollow shaft 22A into shaft exhaust exit 69.

FIG. 36 is a section along line 36—36 in FIG. 32 showing exhaust and fuel-air channels 30–30A and 31–31A respectively within half-blades 3 and 3A. Separation plate 79 divides stationary hollow shaft 22A into fuel-air and exhaust channels 70 and 69 respectively. Exhaust, indicated by arrows 28 and 28A, from half-blades 3 and 3A goes through exhaust channels 30 and 30A respectively into shaft exhaust exit 69 by way of holes 68. Exhaust from intersecting half-blades 4 and 4A (FIG. 32) goes into exit 69 by way of holes 76. Fuel-air, indicated by arrows 27 and 27A, from fuel-air entrance 70 goes through fuel-air channels 31 and 31A leading to half-blades 3 and 3A respectively via holes 77 and curved sections 65. Fuel from fuel-air entrance 70 gets into intersecting half-blades 4 and 4A by way of holes 75 (see FIG. 37). Half-blades 3 and 3A run on left and right bearings 73 and 73A which are sealed from the fuel-air and exhaust by sealings 74. Half-blades 4 and 4A run on bearings 72 and 72A in left and right, also sealed off by sealings 74. Rotating side plates 7 and 7A are connected to main shaft extensions 82 and 82A which rotate on left and right bearings 71 and 74 respectively. Note: most dimensions, including those of hollow shaft 22A, are greatly reduced or exaggerated to allow room for specification numbers and other details.

FIG. 37 is a section along line 37—37 in FIG. 32 and put in to make clear the plumbing of half-blades 4 and 4A which differs from that of half-blades 3 and 3A. Note that main shaft mid-section 24, FIG. 37 has a diameter equal to that of extensions 8 and 8A of circular plates 20 and 20A respectively. Thus, bearings 64 around 8 and 8A are in line with bearings 64A around main shaft mid-section 24. Fuel-air channel 70 and exhaust channel 69 have connecting extensions 31B–31C and 30B–30C by way of holes 75 and 76 respectively. Otherwise the specification numbers are identical.

FIG. 38 is a modification of the fuel-air and exhaust systems within the shaft. The exhaust (arrows 28) still flows to the right but inserted into hollow shaft 22A is another tube 70A through which the fuel-air mixture 27 flows. This penetrates disc 81, permitting fuel-air to enter fuel-air channel 31 (FIGS. 36–37) by way of holes 75 and 77. Stop-plate 80 inserted in hollow shaft 22A confines the fuel-air. At the left, extension 82 of circular plate 7 is closed by plate 78. Left and right bearings 71 and 71A are in the same position as in FIGS. 36–37.

FIGS. 39 and 40 show one exhaust removal and fuel-intake system. Cylindrical shaft 82A rotates within bearings 85 and 85A. Between these two bearings the power produced is taken off by gears within gear-box 21 having sidewalls 84 and 84A. Exhaust is drawn by combination pump 90 having sidewalls 98 and 98A through holes 91 from hollow shaft 22A and is vented through exhaust duct 101. Fuel-air from outside source enters channel 97 in structure 96 by way of pipe 102, thence through holes 93 into center channel 70A (FIG. 38). Closure pieces 94 and 95 at the end of hollow shaft 22A close it off and closure pieces 92 on left keep the fuel-air mixture from the exhaust channel 90. Hollow shaft 22A is mounted on structure 96 having base 103B. One configuration of subject invention, shown in FIG. 40, has engine side plates 7 and 7A with extensions 82 and 82A respectively, the latter extending into gearbox 21 for power take-off and combination pump 90 which draws exhaust out and vents it through duct 101, and simultaneously mixes fuel and air from outside source 102.

I claim:
1. In a rotary Diesel engine for use with a support, a fuel supply, an exhaust system, a starting means and power take-off means, and having a shaft and two intersecting blades as piston means with sealing means mounted thereon inclosed within a housing means, an improvement comprising:
an annular shaped mid-section rotatably mounted upon said shaft with the two half-blades of a main blade rigidly mounted on and extending from opposite sides of the periphery thereof;
an annular ring disposed coaxially about said shaft and main blade and rigidly attached at two diametrically opposed places along its inner surface to the outer ends of said half-blades of the main blade;
two circular plates coaxially and rotatably mounted on said shaft on each side of said mid-section and disposed adjacent to the edges of said main blade;
an intersecting blade comprising two half-blades disposed on diametrically opposite sides of and freely movable around the periphery of said mid-section within the arc not taken up by the half-blades of the main blade attached thereto, each half-blade of the intersecting blade being rigidly attached to the perpendicular walls of said circular plates on each side;
sealing means mounted on the inner edges of the intersecting half-blades between them and the mid-section and on the outer edges between them and the annular ring, and sealing means mounted on the sides of both main half-blades between them and the circular plates;
penetrating said mid-section and both half-blades attached thereto, separate channels comprising: a fuel channel and air channel leading fuel and air from channels in said shaft into each space between adjacent half-blades; an exhaust channel to lead from said spaces between adjacent half-blades into an exhaust channel in said shaft to carry out combustion products; and a channel from each space between adjacent half-blades to direct the explosive force from each combustion therein into and against one of four valve means controlling the opening and closing of said fuel and exhaust channels;
said spaces between adjacent pairs of half-blades being closed off by the adjacent walls of said circular plates and adjacent arcs of said annular ring to form four chambers, one each for the combustion (work), exhaust, intake (suction) and compression strokes used in the Diesel cycle, each of said strokes taking place successively in each of said four chambers; and fuel injection means located within each of said chambers and communicating with said fuel channels, said fuel being sprayed into the appropriate chamber at the end of the compression stroke and being ignited by the high temperature and pressure therein at the start of the combustion (work) stroke, after which combustion products are exhausted through said exhaust channels during the exhaust stroke, the air intake valves being open at the end of the exhaust stroke to let air in through said air channels during the intake (suction) stroke, the reversing blades then reducing the chamber containing said air during said compression stroke, all four strokes being successively repeated in successive chambers in the order named.

2. A rotary Diesel engine according to claim 1 wherein said fuel injection means comprises:
an injector shell mounted on one of said half-blades;
disposed within the shell a fuel valve surrounding a fuel chamber connected with one of said fuel channels, said valve being hollow and sliding back and forth within the injector shell;
a plunger having a plunger head on one end and surrounded by a spring means impinging against said head, spring stop means attached inside said injector, the lower end of said plunger being rigidly attached to the top end of said fuel valve, the spring means restoring said plunger and valve to their place when the pressure on said plunger head is released;
a fuel-emptier means consisting of a small fixed bar attached to and extending upward from the bottom of said fuel injector, and telescoping into said hollow valve so as to expel the fuel from the fuel chamber therein;
an opening near one end of said injector shell through which compressed air will enter during the compression stroke and impinge on said plunger head to drive said valve down around said fuel-emptier means; and
a fuel outlet consisting of a plurality of holes leading from a passage connecting with said fuel chamber into the space between two adjacent half-blades.

3. In a rotary Diesel engine for use with a support, a fuel supply, an exhaust system, a starting means and power take-off means, and having a shaft and two intersecting blades as piston means inclosed within a housing means, the improvement which comprises:
an annular shaped mid-section rotatably mounted upon said shaft with the two half-blades of a main blade rigidly mounted on and extending from opposite sides of the periphery thereof;
an annular ring disposed coaxially about said shaft and main blade and rigidly attached at two diametrically opposed places on its inner surface to the outer ends of said half-blades of the main blade;
two circular plates coaxially and rotatably mounted on said shaft on each side of the mid-section and disposed adjacent to the edges of said main half-blades;
an intersecting blade comprising two separate half-blades disposed on diametrically opposed sides of and freely movable around the periphery of said mid-section within the respective arcs cut off thereon by the attachments thereto of said main half-blades, each half-blade of the intersecting blade being rigidly attached to the perpendicular walls of said circular plates on each side;
sealing means mounted on the inner edges of the intersecting half-blades to close off the space between them and said mid-section, on the outer edges between them and the annular ring, and on the sides of both half-blades of the main blade between them and said circular plates;
penetrating said mid-section and both main half-blades attached thereto, separate channels comprising: a fuel channel leading fuel from a fuel channel in said shaft into each of the main half-blades thence into each of the four chambers surrounded by two adjacent half-blades, the arc of said annular ring cut off by them, and the adjacent walls of said circular plates; an air channel leading from an air channel in said shaft through each of said half-blades into each of said four chambers; a water channel leading water from a water channel means in said shaft through each of said half-blades into each of said four chambers; an exhaust channel leading exhaust products from each of said four chambers through each of said half-blades thence into an exhaust channel means in said shaft to said exhaust system; and a channel means leading from each of said four chambers to dircet the explosive force of combustion gases therein through said half-blades to impinge against the appropriate one of four valve means controlling the opening and closing of said fuel, air, water and exhaust channels;
said four chambers inclosed by each pair of adjacent half-blades, the arc of said annular ring cut off thereby, and the adjacent wall of said circular plates making up at any one time the four chambers of the Diesel cycle 4-stroke engine: compression, combustion (work), exhaust, intake (suction); and
fuel injection means located in each of said four chambers and communicating with said fuel and water channels and one branch of said air channel, for introducing into each of said chambers successively a controlled quantity of fuel, air and water, the air being supplementary to the compressed air already in the combustion chamber to assist combustion, the water assisting combustion, reducing noxious combustion pollutants, adding to the power produced, and cleaning and cooling the engine, said fuel igniting because of the high temperature and pressure in said chamber at the start of the combustion (work) stroke, after which combustion products are exhausted during the exhaust stroke, the chamber being filled with air again during the intake (suction) stroke, the reversing blades then compressing the air during the compression stroke, all four strokes being thus successively repeated in successive chambers in the order named.

References Cited

UNITED STATES PATENTS

| | | | |
|---|---|---|---|
| 1,163,142 | 12/1915 | Gooding | 123—11 |
| 1,224,642 | 5/1917 | Holmes | 123—11 |
| 1,233,579 | 7/1917 | Humphreys | 123—11 |
| 1,308,352 | 7/1919 | Green | 123—11 |
| 3,203,405 | 7/1919 | Sabet | 123—11 |
| 3,227,090 | 1/1966 | Bartolozzi | 123—11 X |
| 3,302,625 | 2/1967 | Cunningham | 123—11 |

RALPH D. BLAKESLEE, *Primary Examiner.*